(12) United States Patent
Prakash et al.

(10) Patent No.: US 8,743,774 B2
(45) Date of Patent: Jun. 3, 2014

(54) RESOURCE REQUESTS FOR A WIRELESS COMMUNICATION SYSTEM

(75) Inventors: Rajat Prakash, San Diego, CA (US);
Fatih Ulupinar, San Diego, CA (US);
Arnab Das, Bethesda, MD (US);
Mohammad Jaber Borran, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 816 days.

(21) Appl. No.: 12/021,819

(22) Filed: Jan. 29, 2008

(65) Prior Publication Data
US 2008/0186931 A1 Aug. 7, 2008

Related U.S. Application Data

(60) Provisional application No. 60/887,342, filed on Jan. 30, 2007, provisional application No. 60/888,192, filed on Feb. 5, 2007.

(51) Int. Cl.
*H04W 4/00* (2009.01)

(52) U.S. Cl.
USPC ....... 370/328; 370/342; 370/345; 370/395.21

(58) Field of Classification Search
USPC ......... 370/328, 331, 335, 498, 468, 337, 401, 370/469; 455/450
See application file for complete search history.

(56) References Cited

U.S. PATENT DOCUMENTS

| 5,936,965 | A | * | 8/1999 | Doshi et al. ................. 370/469 |
| 6,144,653 | A | | 11/2000 | Persson et al. |
| 6,934,752 | B1 | | 8/2005 | Gubbi |
| 7,039,032 | B1 | | 5/2006 | Ho et al. |

(Continued)

FOREIGN PATENT DOCUMENTS

| CN | 1662097 A | 8/2005 |
| EP | 0994604 | 4/2000 |

(Continued)

OTHER PUBLICATIONS

Partial International Search Report, PCT/US08/052531, International Search Authority, European Patent Office, Jul. 8, 2008.

(Continued)

*Primary Examiner* — Brian D Nguyen
*Assistant Examiner* — Toan Nguyen
(74) *Attorney, Agent, or Firm* — François A. Pelaez

(57) ABSTRACT

Techniques for sending resource requests in a wireless communication system are described. Multiple types of quality of service (QoS) information may be supported for resource requests and may include QoS class and latency deadline. A terminal may have data to send on the reverse link and may determine QoS information for the data. The QoS information may include at least one QoS type, which may be dependent on a configuration selected for use to send resource requests. The terminal may also determine backlog level information indicative of the amount of data to send. The terminal may generate a resource request with the backlog level and QoS information. The resource request may include the backlog level information and QoS class information, the backlog level information and either QoS class information or latency deadline information, the backlog level information and latency deadline information, or some other combination of information.

39 Claims, 9 Drawing Sheets

(56) References Cited

U.S. PATENT DOCUMENTS

| | | | |
|---|---|---|---|
| 7,069,033 B1 | 6/2006 | Moon et al. | |
| 7,298,724 B2 | 11/2007 | Lin et al. | |
| 2003/0185181 A1* | 10/2003 | Balachandran et al. | 370/337 |
| 2004/0008726 A1* | 1/2004 | Kelly et al. | 370/468 |
| 2005/0041673 A1* | 2/2005 | Jiang et al. | 370/401 |
| 2005/0111462 A1 | 5/2005 | Walton et al. | |
| 2006/0092963 A1* | 5/2006 | Bakre et al. | 370/437 |
| 2006/0111104 A1 | 5/2006 | Hyslop | |
| 2006/0268786 A1* | 11/2006 | Das et al. | 370/335 |
| 2006/0285515 A1* | 12/2006 | Julian et al. | 370/328 |
| 2007/0036176 A1* | 2/2007 | Quigley et al. | 370/468 |
| 2007/0171849 A1 | 7/2007 | Zhang et al. | |
| 2007/0249360 A1* | 10/2007 | Das et al. | 455/450 |
| 2007/0253449 A1* | 11/2007 | Das et al. | 370/498 |
| 2008/0080469 A1 | 4/2008 | Kolding et al. | |
| 2008/0165698 A1 | 7/2008 | Dalsgaard et al. | |
| 2008/0182609 A1 | 7/2008 | Somasundaram et al. | |
| 2008/0188233 A1 | 8/2008 | Borran et al. | |

FOREIGN PATENT DOCUMENTS

| | | |
|---|---|---|
| EP | 1072102 A1 | 1/2001 |
| EP | 1164714 | 12/2001 |
| EP | 1223776 | 7/2002 |
| EP | 1569492 A2 | 8/2005 |
| GB | 2414901 | 12/2005 |
| JP | 2003198654 A | 7/2003 |
| RU | 2198466 C2 | 2/2003 |
| RU | 2288538 | 11/2006 |
| WO | WO0048327 | 8/2000 |
| WO | 0076233 | 12/2000 |
| WO | 0163849 | 8/2001 |
| WO | WO02093782 A1 | 11/2002 |
| WO | 2004043101 | 5/2004 |
| WO | 2004075468 | 9/2004 |
| WO | 2005032185 | 4/2005 |
| WO | 2006112292 | 10/2006 |
| WO | 2006138339 | 12/2006 |

OTHER PUBLICATIONS

International Search Report, PCT/US08/052531, International Search Authority, European Patent Office Nov. 24, 2008.

Written Opinion, PCT/US08/052531, International Search Authority, European Patent Office, Nov. 24, 2008.

Taiwan Search Report—TW097103537—TIPO—Apr. 24, 2013.

* cited by examiner

|  | Backlog Level (Six values 0 to 5) | | | Backlog Type (Eight 3-bit values 0 to 7) | | | |
|---|---|---|---|---|---|---|---|
| Request Format 1 | 0 | 0 | 0 | 0 ⋮ 1 | 0 ⋮ 1 | 0 ⋮ 1 | 48 Values 0 to 47 |
|  | 0 | 0 | 1 | 0 ⋮ 1 | 0 ⋮ 1 | 0 ⋮ 1 | |
|  | 0 | 1 | 0 | 0 ⋮ 1 | 0 ⋮ 1 | 0 ⋮ 1 | |
|  | 0 | 1 | 1 | 0 ⋮ 1 | 0 ⋮ 1 | 0 ⋮ 1 | |
|  | 1 | 0 | 0 | 0 ⋮ 1 | 0 ⋮ 1 | 0 ⋮ 1 | |
|  | 1 | 0 | 1 | 0 ⋮ 1 | 0 ⋮ 1 | 0 ⋮ 1 | |
| Request Format 2 | 1 | 1 | 0 | 0 ⋮ 1 | 0 ⋮ 1 | 0 ⋮ 1 | 16 Values 48 to 63 |
|  | 1 | 1 | 1 | 0 ⋮ 1 | 0 ⋮ 1 | 0 ⋮ 1 | |

Total Backlog Level
(16 values 48 to 63)

*FIG. 4*

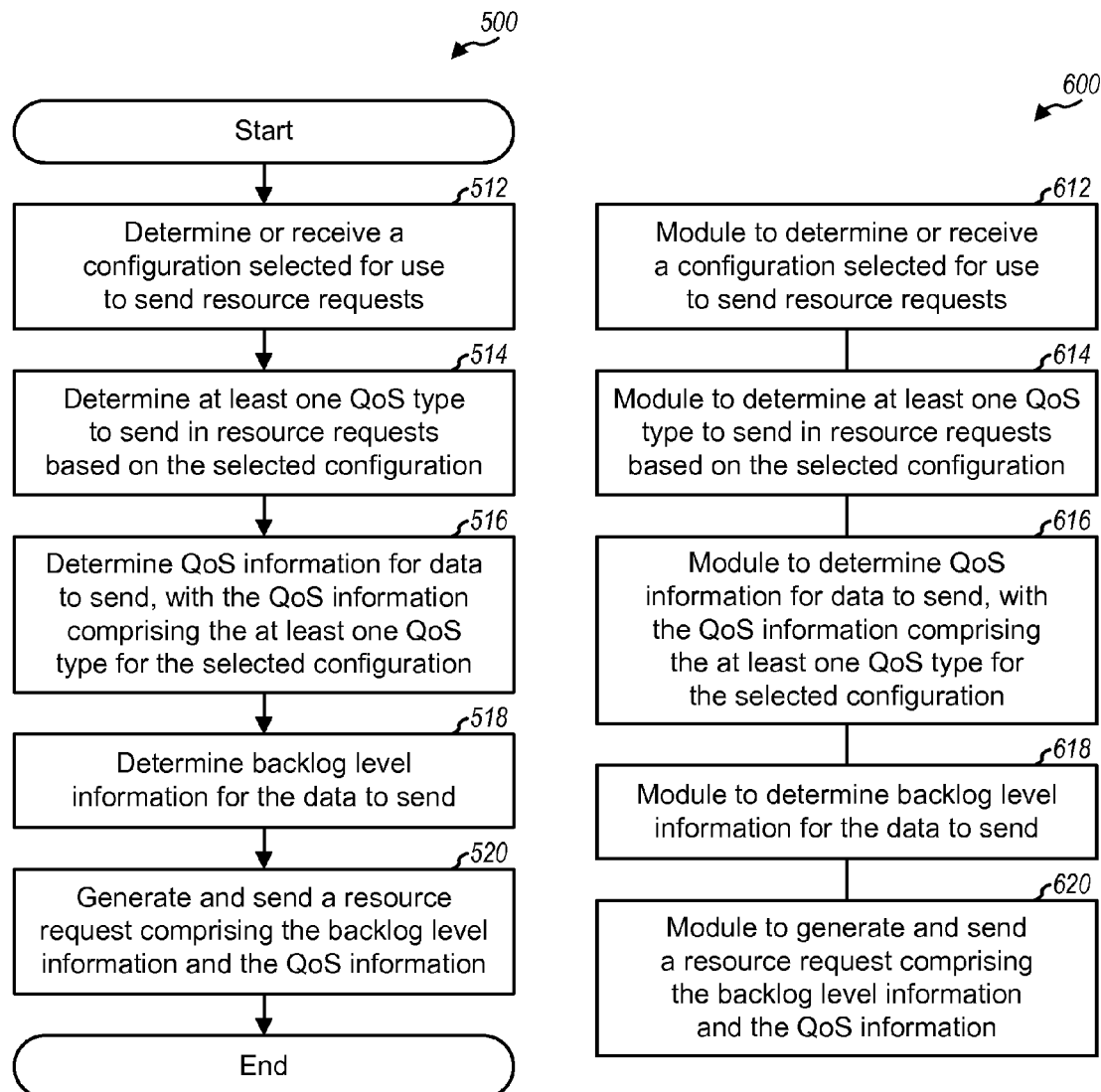

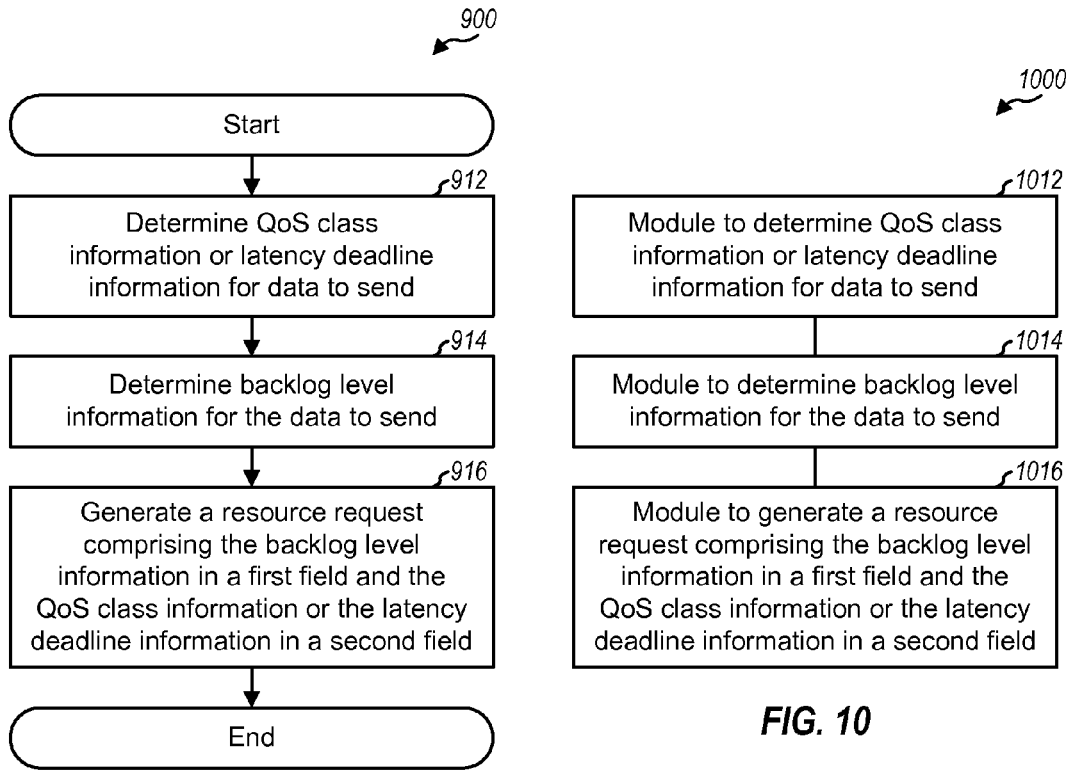
FIG. 9
FIG. 10
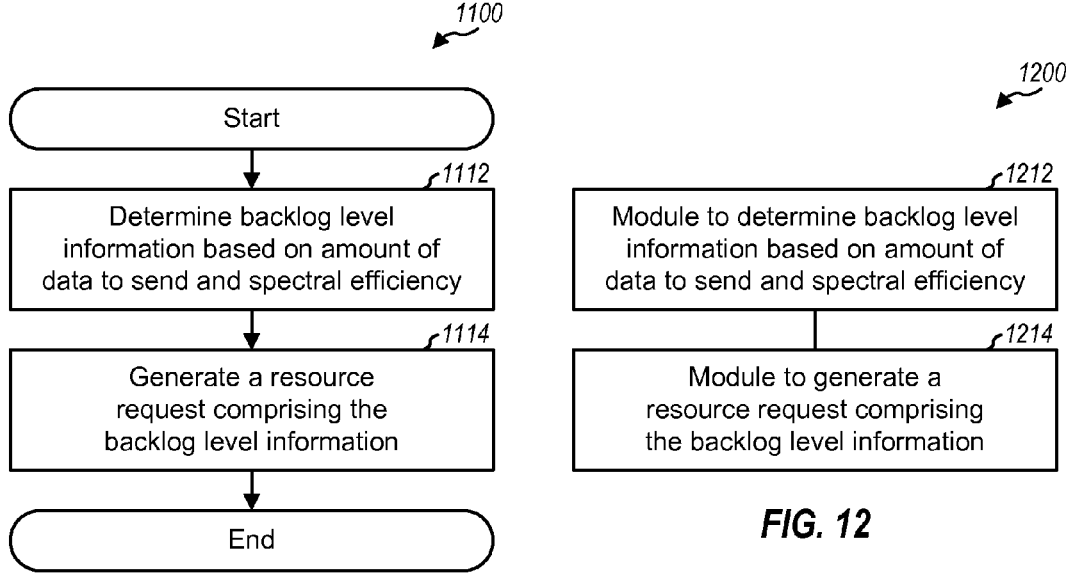
FIG. 11
FIG. 12

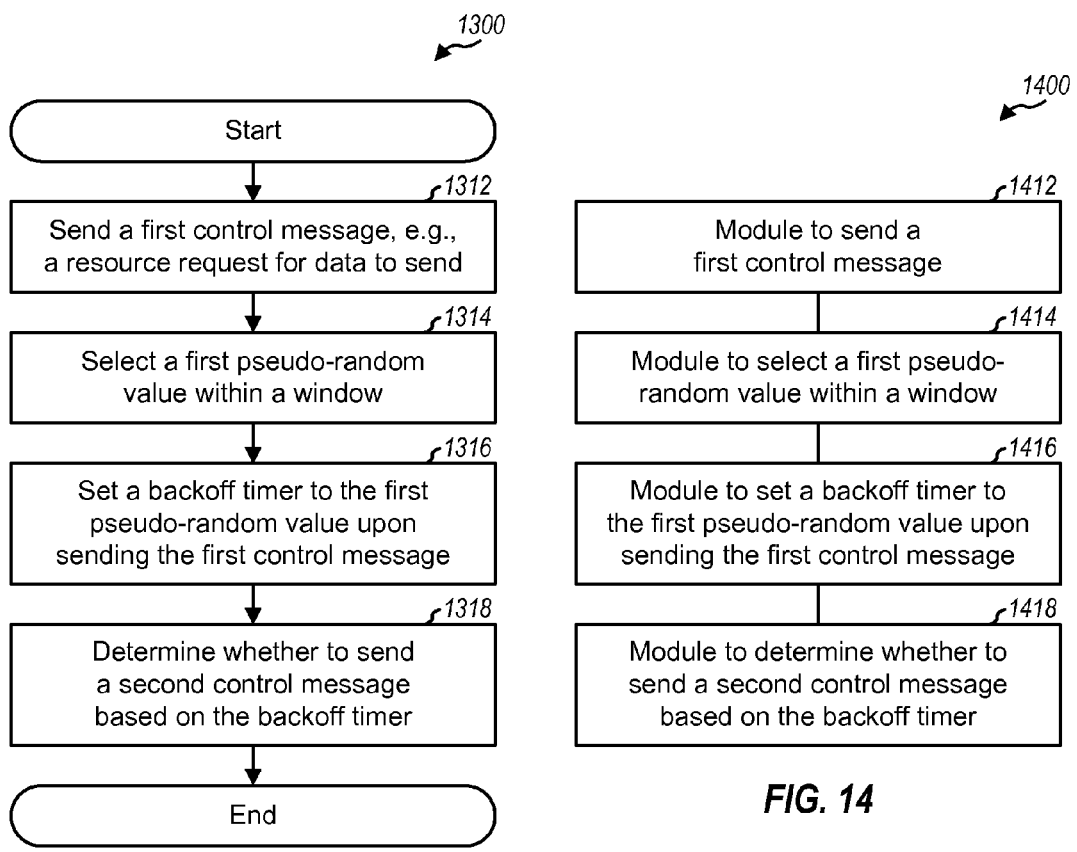

RESOURCE REQUESTS FOR A WIRELESS COMMUNICATION SYSTEM

The present application claims priority to provisional U.S. Application Ser. No. 60/887,342, entitled "A METHOD AND APPARATUS FOR USING A REVERSE CONTROL CHANNEL MAC PROTOCOL," filed Jan. 30, 2007, and provisional U.S. Application Ser. No. 60/888,192, entitled "RESOURCE REQUESTS FOR WIRELESS COMMUNICATION SYSTEMS," filed Feb. 5, 2007, both assigned to the assignee hereof and incorporated herein by reference.

BACKGROUND

I. Field

The present disclosure relates generally to communication, and more specifically to techniques for requesting for radio resources in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that can support communication for many terminals on the forward and reverse links. The forward link (or downlink) refers to the communication link from the base stations to the terminals, and the reverse link (or uplink) refers to the communication link from the terminals to the base stations. The system may utilize a resource assignment scheme in which a terminal may send a request for radio resources whenever the terminal has data to send on the reverse link. In general, radio resources may include time, frequency, code, power, and/or other types of resources usable for transmission. A base station may process the resource request from the terminal and may send a grant of radio resources to the terminal. The terminal may then transmit data on the reverse link using the granted resources. Reverse link resources are consumed to send resource requests. There is therefore a need in the art for techniques to efficiently send resource requests.

SUMMARY

Techniques for sending resource requests in a wireless communication system are described herein. In one aspect, multiple types of quality of service (QoS) information may be supported for resource requests and may include QoS class and latency deadline. A terminal may have data to send on the reverse link and may determine QoS information for the data. The QoS information may comprise at least one QoS type, which may be dependent on a configuration selected for use to send resource requests. The terminal may also determine backlog level information indicative of the amount of data to send. The terminal may generate and send a resource request comprising the backlog level information and the QoS information. In one design, the resource request may include (i) the backlog level information and QoS class information for a first configuration, (ii) the backlog level information and either QoS class information or latency deadline information for a second configuration, or (iii) the backlog level information and latency deadline information for a third configuration. The resource request may also include some other combination of information for other designs.

In another aspect, multiple formats may be supported for resource requests. A terminal may determine at least one type of information to send in a resource request. The terminal may determine a format to use for the resource request from among multiple formats based on the at least one type of information to send. The multiple formats may include a first format for backlog level and QoS information and a second format for only backlog level. The terminal may generate the resource request comprising the at least one type of information in the determined format. In one design, the resource request may have a fixed number of bits (e.g., 6 bits) for all formats, the first format may correspond to a first range of values (e.g., from 0 to 47), and the second format may correspond to a second range of values (e.g., 48 to 63).

Various aspects and features of the disclosure are described in further detail below.

BRIEF DESCRIPTION OF THE DRAWINGS

FIG. 4 shows another representation of the resource request.
FIGS. 5 and 6 show a process and an apparatus, respectively, for sending resource requests with QoS information.
FIGS. 9 and 10 show another process and another apparatus, respectively, for sending resource requests with QoS information.
FIGS. 11 and 12 show a process and an apparatus, respectively, for sending resource requests by considering spectral efficiency.
FIGS. 13 and 14 show a process and an apparatus, respectively, for sending control messages with backoff.

DETAILED DESCRIPTION

Figure 1:
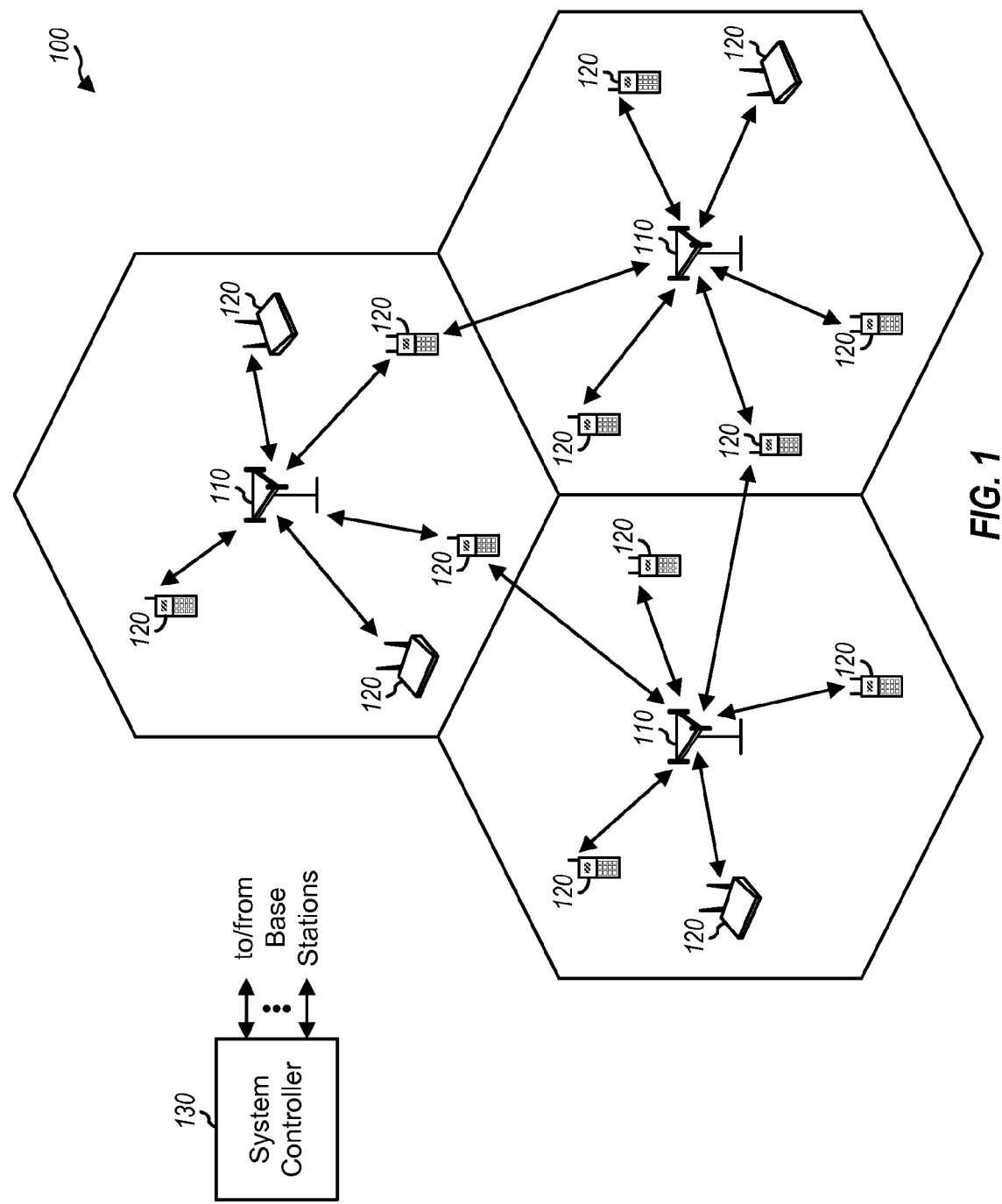
FIG. 1 shows a wireless communication system.

FIG. 1 shows a wireless communication system 100, which may also be referred to as an access network (AN). System 100 may include multiple base stations 110. A base station is a station that communicates with the terminals and may also be referred to as an access point, a Node B, an evolved Node B, etc. Each base station provides communication coverage for a particular geographic area. A system controller 130 may couple to base stations 110 and provide coordination and control for these base stations.

Terminals 120 may be dispersed throughout the system, and each terminal may be stationary or mobile. A terminal may also be referred to as an access terminal (AT), a mobile station, a user equipment, a subscriber station, a station, etc. A terminal may be a cellular phone, a personal digital assistant (PDA), a wireless communication device, a wireless modem, a handheld device, a laptop computer, a cordless phone, etc. A terminal may communicate with zero, one, or multiple base stations on the forward and/or reverse links at any given moment.

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16 (WiMAX), IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

For clarity, certain aspects of the techniques are described below for UMB, and UMB terminology is used in much of the description below. UMB utilizes a combination of orthogonal frequency division multiplexing (OFDM) and code division multiplexing (CDM). UMB is described in 3GPP2 C.S0084-001, entitled "Physical Layer for Ultra Mobile Broadband (UMB) Air Interface Specification," C.S0084-002, entitled "Medium Access Control Layer For Ultra Mobile Broadband (UMB) Air Interface Specification," and C.S0084-003, entitled "Radio Link Layer for Ultra Mobile Broadband (UMB) Air Interface Specification," all dated August 2007 and publicly available.

Figure 2:
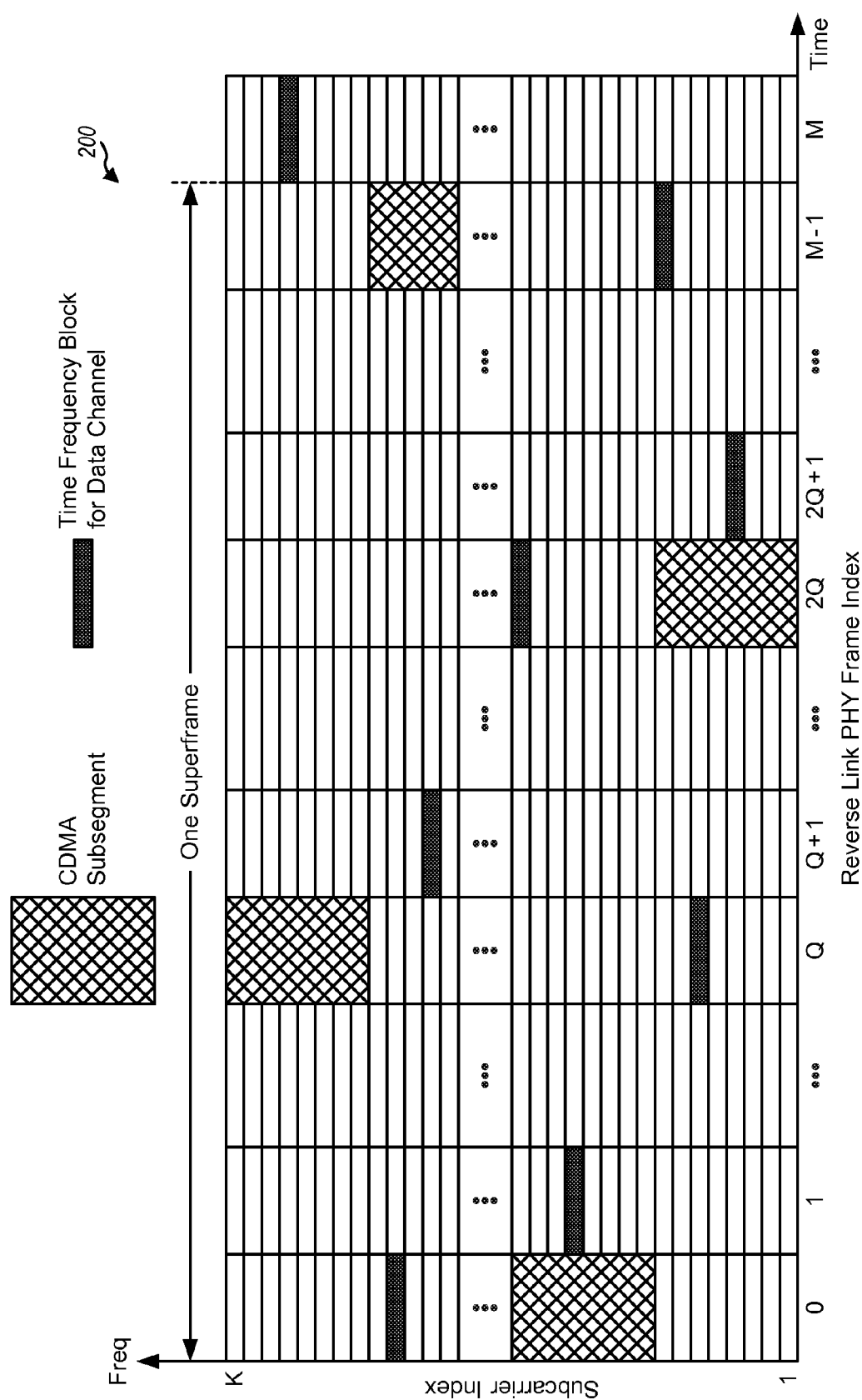
FIG. 2 shows a design of a superframe structure.

FIG. 2 shows a design of a superframe structure 200 that may be used for the reverse link. The transmission timeline may be partitioned into units of superframes. Each superframe may span a particular time duration, which may be fixed or configurable. Each superframe may be partitioned into M physical layer (PHY) frames, where in general M>1. In one design, M=25, and the 25 PHY frames in each superframe are assigned indices of 0 through 24. Each PHY frame may cover N OFDM symbol periods, where in general N>1 and in one design N=8.

FIG. 2 also shows a subcarrier structure. The system bandwidth may be partitioned into multiple (K) orthogonal subcarriers, which may also be referred to as tones, bins, etc. The spacing between adjacent subcarriers may be fixed, and the number of subcarriers may be dependent on the system bandwidth. For example, there may be 128, 256, 512, 1024 or 2048 subcarriers for system bandwidth of 1.25, 2.5, 5, 10 or 20 MHz, respectively.

FIG. 2 also shows a design of a CDMA segment that can support transmission of pilot, signaling, and some traffic data on the reverse link. The CDMA segment may support one or more physical channels such as a Reverse CDMA Dedicated Control Channel (R-CDCCH). The R-CDCCH may carry one or more logical channels such as a reverse link request channel (r-reqch). The CDMA segment may occupy a block of time frequency resources that may be of any dimension. In one design, the CDMA segment may include C CDMA subsegments, where in general C≥1. Each CDMA subsegment may cover S contiguous subcarriers in N OFDM symbol periods of one PHY frame, where S=128 in one design.

In the design shown in FIG. 2, the CDMA segment is sent in every Q PHY frames, where in general Q≥1 and as some examples Q=4, 6, 8, etc. The CDMA segment may hop across the system bandwidth over time (as shown in FIG. 2) or may be sent on a fixed set of subcarriers (not shown in FIG. 2). Multiple terminals may share the CDMA segment for pilot, signaling, etc.

A terminal may be assigned reverse link resources for a Reverse OFDMA Data Channel (R-ODCH). In one design, the assigned resources may be given in units of tiles. A tile may be a block of time frequency resources and may cover a predetermined number of subcarriers in a predetermined number of symbol periods. In one design, a tile covers 16 subcarriers in 8 symbol periods of one PHY frame and may be used to send up to 128 symbols. The assigned tiles may hop across the system bandwidth based on a hopping pattern, as shown in FIG. 2. The terminal may transmit data and/or inband signaling on the assigned tiles.

The terminal may communicate with the access network to configure one or more flows. Each flow may be a collection of one or more streams. Each stream may be a collection of one or more higher layer applications and may carry data and/or control information for the one or more applications. Each application may be associated with a reservation, which may comprise a set of packet filters for identifying packets for that application. For example, different applications such as HyperText Transfer Protocol (HTTP), File Transfer Protocol (FTP), voice, and video may be mapped to one or more streams carried on one or more flows. Each application may have certain requirements. The terminal may reports the requirements of activated applications using QoS blobs or profiles. The access network may determine the QoS requirements of each flow based on the reported QoS blobs or profiles for all applications mapped to that flow. Each flow may belong to a particular QoS class, which may be associated with a set of QoS requirements for that flow. Different QoS classes may be associated with different sets of QoS requirements.

In one design, multiple configurations may be supported for flows. In a first flow configuration, up to eight flows may be supported, and each flow may be associated with a different QoS class. In a second flow configuration, up to four flows may be supported, and each flow may be associated with a different QoS class. A suitable flow configuration may be selected (e.g., by the access network) based on the reported QoS blobs or profiles for all activated applications at the terminal.

The terminal may send data for each stream on the R-ODCH whenever there is data to send. The R-ODCH may be scheduled by a scheduler for a base station. The terminal may send a resource request on the request channel whenever there is data to send for any stream. The scheduler may assign resources on the R-ODCH to the terminal in response to the resource request. It may be desirable for the resource request to provide pertinent information regarding the data to be sent by the terminal in order to support efficient scheduling and assignment of resources.

In an aspect, a resource request may include information indicative of the amount of data to send as well as QoS information for the data. The information indicative of the amount of data to send may also be referred to as backlog level, buffer size, queue size, payload size, etc. For clarity, backlog level is used in much of the description below. The QoS information may be provided in several manners, as described below. The backlog level information and the QoS information may be used by the scheduler to decide which terminal to schedule for data transmission on the reverse link and/or how much resources to assign to each scheduled terminal.

A resource request may have a fixed size and may be sent with a fixed number of bits. It is desirable to utilize the available bits to convey as much information as possible for the data to send. In general, any number of bits may be used for a resource request. For clarity, much of the following description is for a design in which a resource request is sent with six bits.

Figure 3:
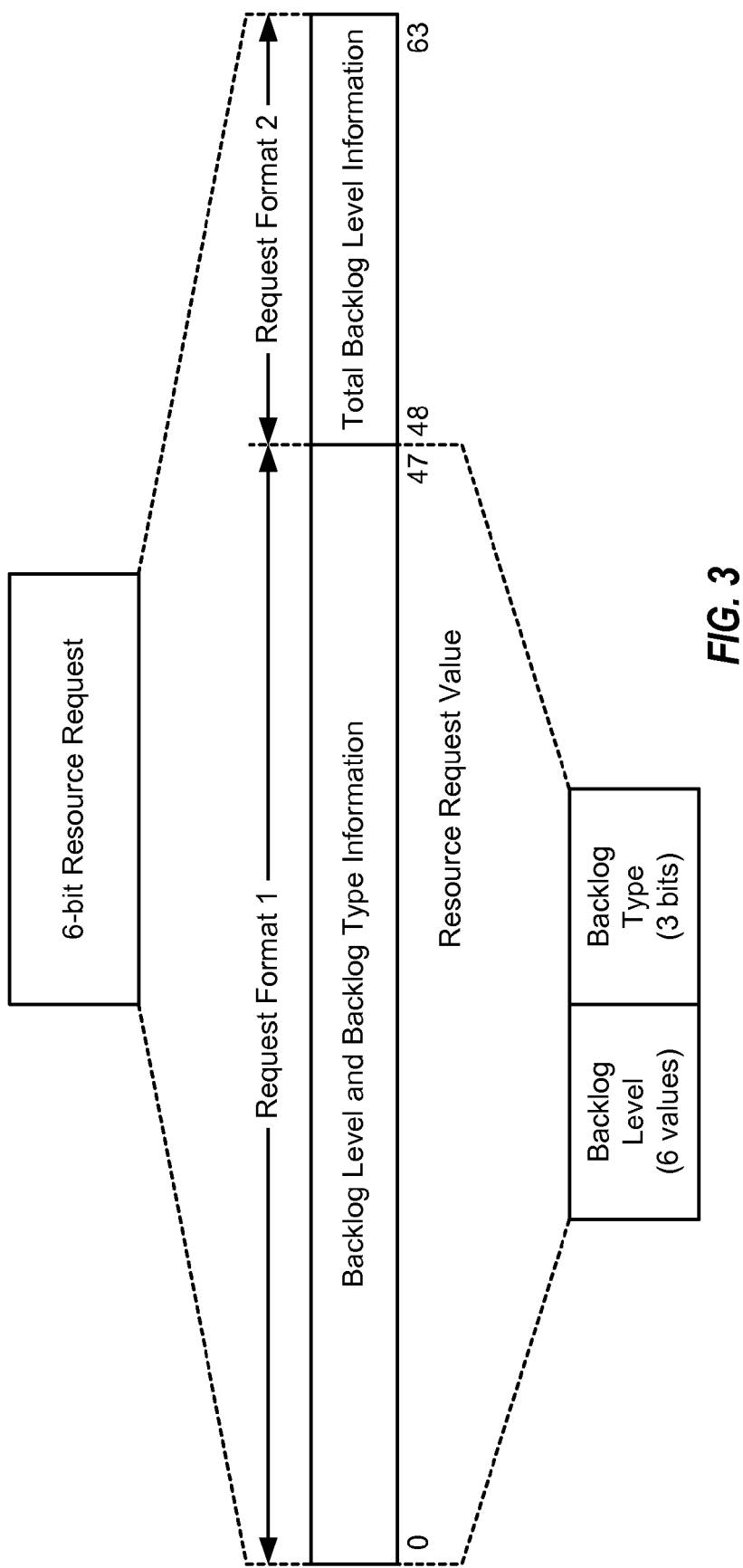
FIG. 3 shows a design of a resource request.

FIG. 3 shows a design of a resource request, which may also be referred to as a request report, a REQReport, a REQCHReport, etc. In this design, the resource request is sent with six bits and has a value within a total range of 0 to 63.

In the design shown in FIG. 3, the total range is partitioned into two ranges for two request formats. The first range of 0 to 47 is used for request format 1, and the second range of 48 to 63 is used for request format 2. For request format 1, both backlog level information and backlog type information are sent in the resource request. The backlog type information comprises QoS information for the data to send. In the design shown in FIG. 3, the backlog level information comprises one of six possible values, the backlog type information comprises one of eight possible values, and one of 48 possible combinations may be sent in the resource request using request format 1. For request format 2, only backlog level information is sent in the resource request, and the backlog type information is omitted. The backlog level information comprises one of 16 possible values.

FIG. 4 shows another representation of the resource request for the design shown in FIG. 3. The first three bits (e.g., the three most significant bits (MSBs)) of the resource request have eight possible values '000' through '111' (binary), as shown in FIG. 4. The first six values '000' through '101' are for request format 1, and the last two values '110' and '111' are for request format 2. For request format 1, the first three bits provide one of six possible values '000' through '101' for backlog level, and the last three bits provide one of eight possible values '000' through '111' for backlog type. For request format 2, the six bits provide one of 16 possible values '110000' through '111111' for backlog type. The values for backlog level and backlog type are described below.

In general, the total range of values for a resource request may be partitioned into any number of ranges for any number of request formats. Each range may cover any number of values and may have a size determined based on the amount of information to send using the associated request format. Each request format may include any type of information and may use any message format for all of the types of information to send using that request format. For clarity, much of the following description is for the two request formats shown in FIG. 3.

In one design, the backlog level information is given by a quantity that takes into account spectral efficiency (SE) achievable by the terminal. Spectral efficiency may be given by the number of information bits that can be sent on one subcarrier in one symbol period and may be dependent on the code rate and modulation order used for data transmission. For example, a spectral efficiency of 1 may be achieved with code rate ½ and QPSK. Spectral efficiency may be dependent on channel conditions, so that higher spectral efficiency may be achievable under good channel conditions and lower spectral efficiency may be achievable under poor channel conditions. For a given amount of resources, more data may be transmitted at higher spectral efficiency, and vice versa. By taking into account spectral efficiency, the amount of data to send may be quantized more appropriately, and the backlog level information can better convey the requested amount of resources. The spectral efficiency to use in determining the backlog level information may be the spectral efficiency for the last resource assignment, the spectral efficiency used for the last data transmission on the reverse link, the spectral efficiency indicated by a channel quality indicator (CQI) sent by the terminal, etc.

Table 1 shows two designs of providing backlog level information. In a first design, the backlog level information indicates the number of base tiles being requested, which is given in the second column of Table 1. In this design, the terminal may first compute the number of tiles, t, needed for the data to send. The terminal may determine a factor g based on the spectral efficiency. This factor may be equal to 5 for spectral efficiency of 0.2, equal to 2 for spectral efficiency of 0.5, and equal to 1 for spectral efficiency of 1 or higher. The number of base tiles, m, may then be computed as m=t/g. In a second design, the backlog level information indicates the number of bytes of data to send. For spectral efficiency of 1 or lower, the number of bytes may be given as shown in the third column of Table 1. For spectral efficiency of greater than 1, the number of bytes may be scaled by the spectral efficiency and given as shown in the fourth column of Table 1. For example, a backlog level value of 2 would indicate 128 bytes for spectral efficiency of 1 or lower, 256 bytes for spectral efficiency of 2, 384 bytes for spectral efficiency of 3, etc. The backlog level information may also be provided in other manners.

TABLE 1

| Backlog Level | Number of Base Tiles | Spectral Efficiency ≤ 1 Number of Backlog Bytes | Spectral Efficiency > 1 Number of Backlog Bytes |
| --- | --- | --- | --- |
| 0 | 1 | 34 | 34*SE |
| 1 | 2 | 64 | 64*SE |
| 2 | 4 | 128 | 128*SE |
| 3 | 8 | 256 | 256*SE |
| 4 | 16 | 512 | 512*SE |
| 5 | >16 | >512 | >512*SE |

In one design, multiple request configurations or modes may be supported for the backlog type information sent in request format 1 and may be used to provide different types of QoS information. In one design, one request configuration may be selected for use by the access network and sent to the terminal, e.g., in a REQConfig parameter sent via higher layer signaling. In one design, each request configuration may allow the backlog type information to be given in terms of QoS class or latency deadline. Latency deadline may be the time remaining before a packet expires and may be dependent on the packet arrival time and the maximum latency for the packet. QoS class may also be referred to as flow class. Different flows may belong in different QoS classes, which may be associated with different QoS requirements as described above.

In one design, each stream may be associated with latency type or QoS class type signaling for resource requests. For each latency type stream, the access network may assign a latency deadline that indicates the maximum amount of time a packet for that stream can wait before expiring. For each QoS class type stream, the access network may assign a QoS class for the flow to which the stream belongs. Resource requests for each stream may include (i) QoS class information if the stream is associated with a QoS class or (ii) latency deadline information if the stream is associated with a latency deadline. The terminal may determine latency deadline or QoS class information for data to send for a stream and may provide this latency deadline or QoS class information in a resource request.

In one design, three request configurations may be supported for the backlog type information and may be identified by REQConfig=1, 2 and 3. In one design, the first request configuration with REQConfig=1 supports reporting of one of eight possible QoS class values, as shown in Table 2. In this configuration, each stream may be associated with a Cfg1QoSClass value that may be indicated by a stream attribute. A resource request for a given stream NN (where NN is a stream ID) may include the Cfg1QoSClass value for this stream as the backlog type information. The first request configuration may be used to signal a buffer level associated with one of several QoS classes.

TABLE 2

REQConfig = 1

| Backlog Type | Interpretation |
|---|---|
| 0 to 7 | Cfg1QoSClass |

In one design, the second request configuration with REQConfig=2 supports reporting of either one of four possible QoS class values or one of four possible latency deadline values, as shown in Table 3. In this configuration, each stream may be associated with a Cfg2QoSClass value that may be indicated by a stream attribute. A resource request for a given stream NN may include the Cfg2QoSClass value for this stream as the backlog type information. Alternatively, the resource request may include a latency deadline value for stream NN as the backlog type information.

TABLE 3

REQConfig = 2

| Backlog Type | Interpretation | |
|---|---|---|
| 0 to 3 | Cfg2QoSClass | |
| 4 | Latency deadline | 20 |
| 5 | in millisecond (ms) | 40 |
| 6 | | 80 |
| 7 | | 120 |

In one design, the third request configuration with REQConfig=3 supports reporting of one of eight possible latency deadline values, as shown in Table 4. In this configuration, a resource request for a given stream NN may include the latency deadline for this stream as the backlog type information. The third request configuration may be used to signal a buffer level associated with one of several latency deadlines. The backlog level information sent in the resource request may indicate the aggregate amount of data to send for all streams having the signaled latency deadline. For example, if stream 1 has 100 bytes with a latency deadline of 20 ms, stream 2 has 200 bytes with a latency deadline of 20 ms, and stream 3 has 150 bytes with a latency deadline of 40 ms, then the terminal may send a resource request of 300 bytes with a latency deadline of 20 ms for streams 1 and 2.

TABLE 4

REQConfig = 3

| Backlog Type | Latency Deadline (ms) |
|---|---|
| 0 | 20 |
| 1 | 40 |
| 2 | 60 |
| 3 | 80 |
| 4 | 100 |
| 5 | 120 |
| 6 | 160 |
| 7 | 200 |

Tables 2 through 4 show example designs of three request configurations for the backlog type information. In general, any number of request configurations may be supported, and each request configuration may provide any type of QoS information.

Request format 1 may be used to provide both backlog level and backlog type information for one or more streams belonging in the same QoS class or having the same latency deadline. The backlog type information may comprise a specific QoS class or a specific latency deadline for the one or more streams. Backlog level and backlog type information for streams belonging in different QoS classes or having different latency deadlines may be sent in multiple resource requests, e.g., one resource request for each set of one or more streams having the same QoS class or the same latency deadline.

Request format 2 may be used to provide total backlog level for all streams and may also be used when QoS information is not specified for a stream. The backlog levels for all streams may be summed to obtain the total backlog level. In one design, the total backlog level is given with a quantity that takes into account the spectral efficiency achievable by the terminal. Table 5 shows two designs of providing total backlog level information. In a first design, the total backlog level information indicates the number of base tiles being requested, which is given in the second column of Table 5. The terminal may compute the number of base tiles as described above for Table 1. In a second design, the total backlog level information indicates the total number of bytes of data scaled by the spectral efficiency and is given in the fourth column of Table 5, where "k" represents 1024 bytes.

TABLE 5

Total Backlog Level for Request Format 2

| r-reqch value | Number of Tiles | Number of Backlog Bytes |
|---|---|---|
| '110000' | 4 | 64*SE |
| '110001' | 8 | 128*SE |
| '110010' | 12 | 256*SE |
| '110011' | 16 | 384*SE |
| '110100' | 32 | 512*SE |
| '110101' | 48 | 1024*SE |
| '110110' | 64 | 1536*SE |
| '110111' | 80 | 2k*SE |
| '111000' | 96 | 4k*SE |
| '111001' | 128 | 6k*SE |
| '111010' | 160 | 8k*SE |
| '111011' | 224 | 12k*SE |
| '111100' | 288 | 16k*SE |
| '111101' | 352 | 32k*SE |
| '111110' | 416 | 48k*SE |
| '111111' | >416 | 64k*SE |

To generate a resource request, the terminal may first determine the number of backlog bytes, which may include the data to send, overhead such as a cyclic redundancy check (CRC), any inband signaling to send with the data, etc. The terminal may map the number of backlog bytes to a backlog level value based on a mapping that may be dependent on the selected request format as well as the spectral efficiency. This spectral efficiency may be the spectral efficiency of the last reverse link assignment, the current achievable spectral efficiency, a default spectral efficiency (e.g., if the terminal has not received any reverse link assignment from the scheduler), etc. The terminal may then generate the resource request based on the backlog level information and backlog type/QoS information (if applicable).

The terminal may send a resource request to provide the scheduler with backlog level information and possibly QoS information regarding the status of the buffers at the terminal. The terminal may send the resource request as out-of-band signaling on the r-reqch, which may be sent on the R-CDCCH in a CDMA subsegment. The terminal may also send the resource request as in-band signaling along with data on the R-ODCH.

In one design, the terminal may send resource requests as inband signaling on the R-ODCH as follows. The terminal may send a resource request in a packet and may start an inband request timer when the packet is sent. The terminal may halt the inband request timer if the packet is decoded in error and may restart the timer if the packet is decoded correctly. While the inband request timer is active, the terminal may send another resource request only if the terminal has new backlog information that was not considered in the last inband resource request. The inband request timer may be used to prevent usage of the control channel when the same information has already been sent inband. This may reduce loading on the control channel. The terminal may send inband resource requests in the highest priority flow, in the lowest latency packet, in packets larger than a predetermined size, etc.

In one design, the terminal may send resource requests as out-of-band signaling on the R-CDCCH in the CDMA subsegment based on a backoff scheme. The terminal may start a backoff timer after sending a resource request on the r-reqch. While the backoff timer is active, the terminal may refrain from sending resource requests except for (i) a resource request for a stream with a priority higher than the highest priority of all stream(s) in the last resource request or (ii) a resource request to indicate the lowest latency requirement (of 20 ms in the design above) or less, which was not indicated in the last resource request. The terminal may set the timer to a pseudo-random value within a window of 0 to W and may increase (e.g., double) W whenever a resource request is sent and a resource assignment is not received within a predetermined time period. The terminal may reset the backoff timer to zero after a handoff, e.g., from one serving sector to another serving sector. This backoff scheme may prevent overloading of the CDMA subsegment and may also be applied to other control channels, e.g., a CQI channel. The terminal may send a resource request on the R-CDCCH (instead of the R-CDCCH) if it is available within F PHY frames, where F may be equal to 4, 8, 12, etc.

FIG. 5 shows a design of a process 500 for sending resource requests with QoS information. Process 500 may be performed by a terminal or some other entity. The terminal may determine or receive a configuration selected for use to send resource requests from among multiple configurations (block 512). Each configuration may be associated with at least one of multiple possible QoS types. In one design, the multiple possible QoS types comprise QoS class and latency deadline. The terminal may determine at least one QoS type to send in resource requests based on the selected configuration (block 514).

The terminal may have data to send and may determine QoS information for the data (block 516). The QoS information may comprise the at least one QoS type for the selected configuration. The terminal may also determine backlog level information for the data to send (block 518). The backlog level information may comprise one of a plurality of backlog level values, which may be applicable for all configurations. The terminal may generate and send a resource request comprising the backlog level information and the QoS information (block 520).

In one design, the resource request may include (i) the backlog level information and QoS class information if a first configuration is selected, (ii) the backlog level information and either QoS class information or latency deadline information if a second configuration is selected, or (iii) the backlog level information and latency deadline information if a third configuration is selected. The resource request may also comprise other combinations of information in other designs.

In one design, the resource request may include one of eight possible QoS class values for the first configuration or one of four possible QoS class values for the second configuration. In one design, the resource request may include one of four possible latency deadline values for the second configuration or one of eight possible latency deadline values for the third configuration. The first configuration may be selected for a first number of flows (e.g., eight flows), and the second configuration may be selected for a second number of flows (e.g., four flows). The resource request may comprise a fixed number of bits (e.g., six bits) for all configurations.

FIG. 6 shows a design of an apparatus 600 for sending resource requests with QoS information. Apparatus 600 includes means for determining or receiving a configuration selected for use to send resource requests (module 612), means for determining at least one QoS type to send in resource requests based on the selected configuration (module 614), means for determining QoS information for data to send, with the QoS information comprising the at least one QoS type for the selected configuration (module 616), means for determining backlog level information for the data to send (module 618), and means for generating a resource request comprising the backlog level information and the QoS information (module 620).

Figure 7:
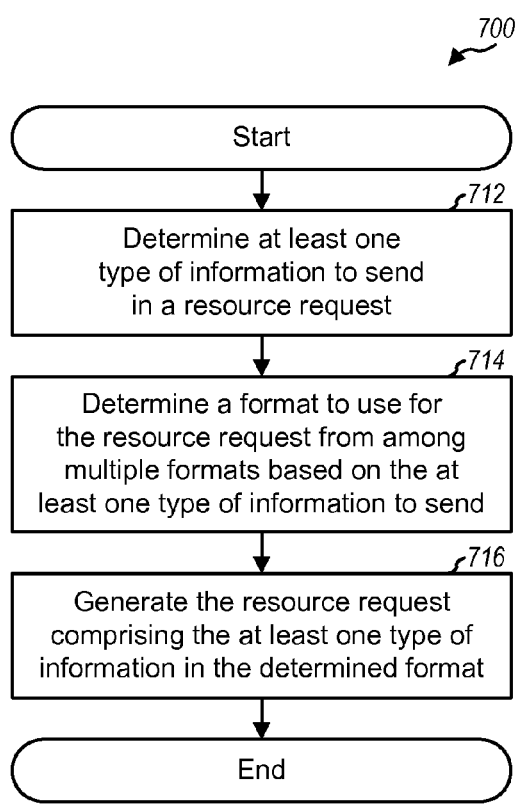
FIGS. 7 and 8 show a process and an apparatus, respectively, for sending resource requests with different formats.

FIG. 7 shows a design of a process 700 for sending resource requests with different formats. Process 700 may be performed by a terminal or some other entity. The terminal may determine at least one type of information to send in a resource request (block 712). The terminal may determine a format to use for the resource request from among multiple formats based on the at least one type of information to send (block 714). The multiple formats may comprise a first format for backlog level information and QoS information and a second format for only backlog level information. The terminal may use the first format if the at least one type of information comprises backlog level information and QoS information. The terminal may use the second format if the at least one type of information comprises only backlog level information. The terminal may use the first format if the resource request is for a specific stream and may use the second format if the resource request is for multiple streams. The terminal may use the first format for a stream associated with QoS information and may use the second format for a stream associated with no QoS information or for multiple streams with varying QoS information. The terminal may also select the first or second format based on other criteria.

The terminal may generate the resource request comprising the at least one type of information in the determined format (block 716). The resource request may comprise a fixed number of bits (e.g., six bits) for all of the multiple formats. The first format may correspond to a first range of values (e.g., from 0 to 47) for the resource request, and the second format may correspond to a second range of values (e.g., 48 to 63).

Figure 8:
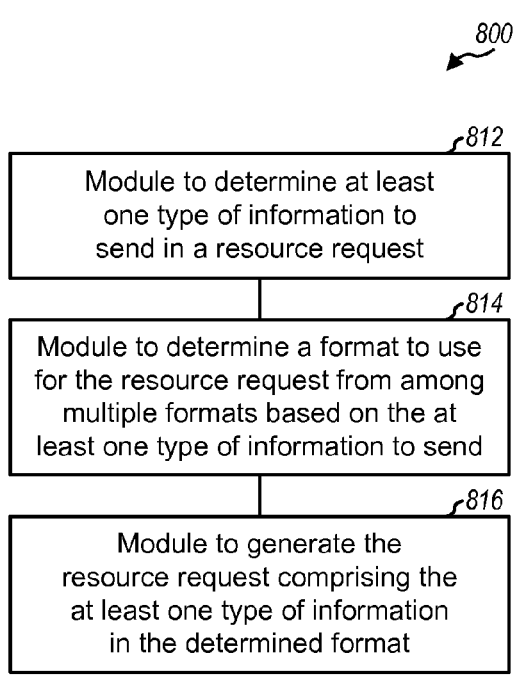

FIG. 8 shows a design of an apparatus 800 for sending resource requests with different formats. Apparatus 800 includes means for determining at least one type of information to send in a resource request (module 812), means for determining a format to use for the resource request from among multiple formats based on the at least one type of information to send (module 814), and means for generating the resource request comprising the at least one type of information in the determined format (module 816).

FIG. 9 shows a design of a process 900 for sending resource requests with QoS information. Process 900 may be performed by a terminal or some other entity. The terminal may determine QoS class information or latency deadline information for data to send (block 912). The terminal may determine backlog level information for the data to send (block 914). The terminal may generate a resource request comprising the backlog level information in a first field and the QoS class information or the latency deadline information in a second field (block 916).

In one design of block 912, the terminal may identify at least one stream to which the data to send belongs and may determine whether the at least one stream is associated with QoS class or latency deadline. The terminal may then determine (i) the QoS class information for the at least one stream if associated with QoS class or (ii) the latency deadline information for the at least one stream if associated with latency deadline.

In one design of block 916, the terminal may (i) map the QoS class information to a first range of values for the second field or (ii) map the latency deadline information to a second range of values for the second field. In one design, the second field may include three bits, and the terminal may (i) map the QoS class information to one of four possible values for the second field or (ii) map the latency deadline information to one of four different possible values for the second field.

FIG. 10 shows a design of an apparatus 1000 for sending resource requests with QoS information. Apparatus 1000 includes means for determining QoS class information or latency deadline information for data to send (module 1012), means for determining backlog level information for the data to send (module 1014), and means for generating a resource request comprising the backlog level information in a first field and the QoS class information or the latency deadline information in a second field (module 1016).

FIG. 11 shows a design of a process 1100 for sending resource requests by considering spectral efficiency. Process 1100 may be performed by a terminal or some other entity. The terminal may determine backlog level information based on amount of data to send and spectral efficiency (block 1112). The terminal may determine the spectral efficiency based on the most recent assignment of resources, the most recent CQI, etc. The terminal may generate a resource request comprising the backlog level information (block 1114).

In one design, the terminal may select one of multiple backlog level values corresponding to different numbers of bytes scaled by the spectral efficiency, e.g., as shown in Table 1 or 5. In another design, the terminal may select one of multiple backlog level values corresponding to (i) different numbers of bytes scaled by the spectral efficiency if the spectral efficiency is greater than a threshold value or (ii) different numbers of bytes if the spectral efficiency is equal to or less than the threshold value, e.g., as shown in Table 1. In yet another design, the terminal may select one of multiple backlog level values corresponding to different numbers of tiles determined based on the spectral efficiency, e.g., as shown in Table 1 or 5. The terminal may also select one of multiple backlog level values in other manners. For all designs, the terminal may generate the resource request comprising the selected backlog level value.

FIG. 12 shows a design of an apparatus 1200 for sending resource requests by considering spectral efficiency. Apparatus 1200 includes means for determining backlog level information based on amount of data to send and spectral efficiency (module 1212) and means for generating a resource request comprising the backlog level information (module 1214).

FIG. 13 shows a design of a process 1300 for sending control messages with backoff. Process 1300 may be performed by a terminal or some other entity. The terminal may send a first control message, e.g., a resource request for data to send, a handoff request, a CQI report, etc. (block 1312).

The terminal may select a first pseudo-random value within a window (block 1314) and may set a backoff timer to the first pseudo-random value upon sending the first control message (block 1316).

The terminal may determine whether to send a second control message based on the backoff timer (block 1318). In one design, the terminal may send the second control message if a response is not received for the first control message (e.g., an assignment is not received for the resource request) and the backoff timer expires. The terminal may increase the window after sending the second control message, select a second pseudo-random value within the increased window, and set the backoff timer to the second pseudo-random value upon sending the second control message. The terminal may then determine whether to send another control message based on the backoff timer.

In one design, the control messages are resource requests, and the terminal may send the second resource request for a stream before the backoff timer expires if (i) the stream has higher priority than the highest priority of at least one stream signaled in the first resource request, (ii) the stream has a shortest latency deadline and the shortest latency deadline is not signaled in the first resource request, or (iii) some other criterion is satisfied.

FIG. 14 shows a design of an apparatus 1400 for sending control messages with backoff. Apparatus 1400 includes means for sending a first control message, e.g., a resource request for data to send (module 1412), means for selecting a first pseudo-random value within a window (module 1414), means for setting a backoff timer to the first pseudo-random value upon sending the first control message (module 1416), and means for determining whether to send a second control message based on the backoff timer (module 1418).

The modules in FIGS. 6, 8, 10, 12 and 14 may comprise processors, electronics devices, hardware devices, electronics components, logical circuits, memories, etc., or any combination thereof.

Figure 15:
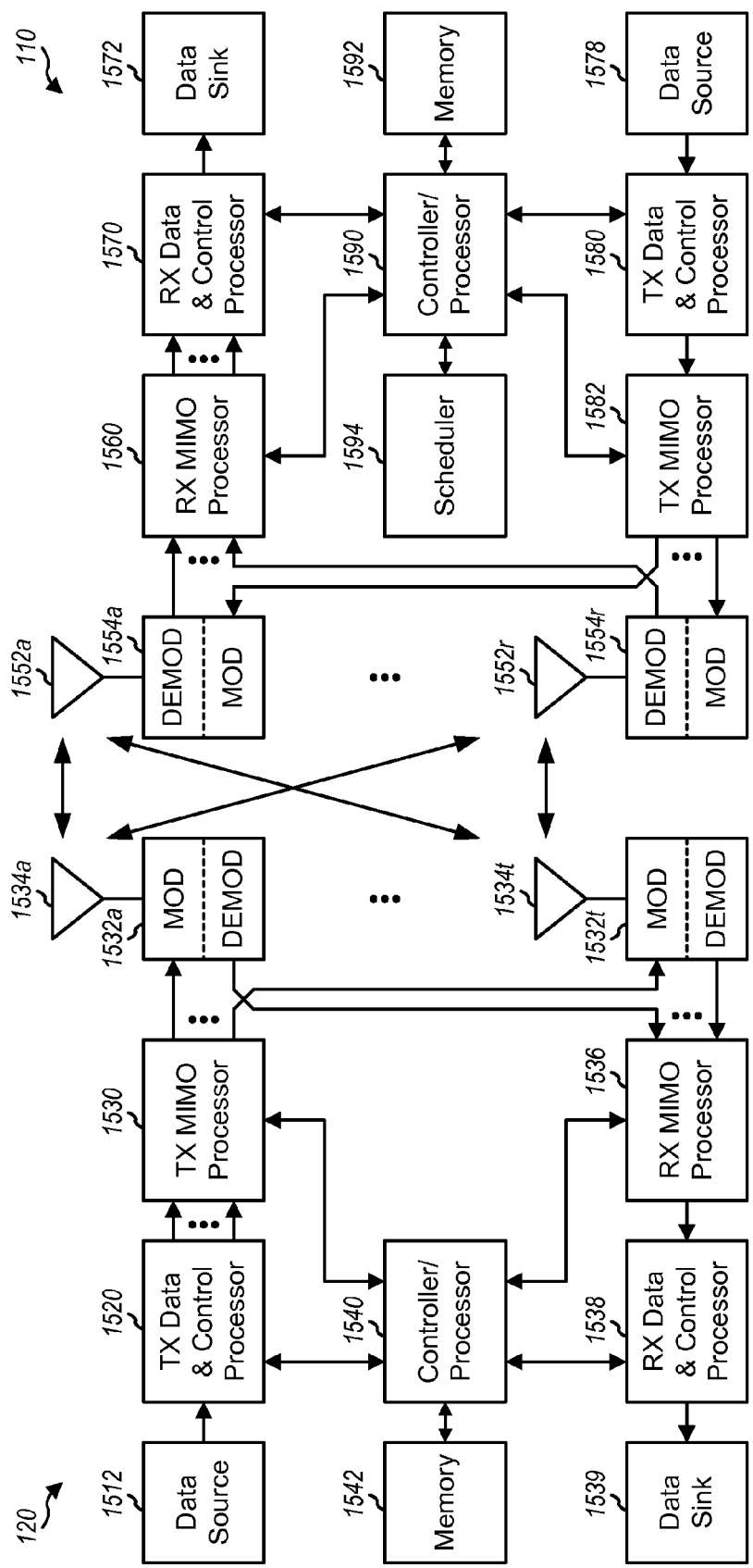
FIG. 15 shows a block diagram of a base station and a terminal.

FIG. 15 shows a block diagram of a design of base station 110 and terminal 120, which are one of the base stations and one of the terminals in FIG. 1. In this design, terminal 120 is equipped with T antennas 1534a through 1534t, and base station 110 is equipped with R antennas 1552a through 1552r, where in general T≥1 and R≥1.

At terminal 120, a transmit (TX) data and control processor 1520 may receive traffic data from a data source 1512, process (e.g., encode, interleave, scramble, and symbol map) the traffic data, and provide data symbols. Processor 1520 may also receive control information (e.g., resource requests) from a controller/processor 1540, process the control information, and provide control symbols. Processor 1520 may also generate and multiplex pilot symbols with the data and control symbols. A TX MIMO processor 1530 may process (e.g., precode) the symbols from processor 1520 and provide T output symbol streams to T modulators (MOD) 1532a through 1532t. TX MIMO processor 1530 may be omitted if terminal 120 is equipped with a single antenna. Each modulator 1532 may process its output symbol stream (e.g., for OFDM, CDM, etc.) to obtain an output chip stream. Each modulator 1532 may further condition (e.g., convert to analog, filter, amplify, and upconvert) its output chip stream to generate a reverse link signal. T reverse link signals from modulators 1532a through 1532t may be transmitted via T antennas 1534a through 1534t, respectively.

At base station 110, antennas 1552a through 1552r may receive the reverse link signals from terminal 120 and/or other terminals. Each antenna 1552 may provide a received signal to a respective demodulator (DEMOD) 1554. Each demodulator 1554 may condition (e.g., filter, amplify, downconvert, and digitize) its received signal to obtain samples and may further process the samples (e.g., for OFDM, CDM, etc.) to obtain demodulated symbols. An RX MIMO processor 1560 may perform MIMO detection on the demodulated symbols from all R demodulators 1554a through 1554r and provide detected symbols. A receive (RX) data and control processor 1570 may process (e.g., demodulate, deinterleave, descramble, and decode) the detected symbols, provide decoded data to a data sink 1572, and provide decoded control information (e.g., resource requests) to a controller/processor 1590. In general, the processing by processors 1560 and 1570 is complementary to the processing by processors 1530 and 1520, respectively, at terminal 120.

Base station 110 may transmit traffic data and/or control information on the forward link to terminal 120. Traffic data from a data source 1578 and/or control information (e.g., resource assignments) from controller/processor 1590 may be processed by a TX data and control processor 1580 and further processed by a TX MIMO processor 1582 to obtain R output symbol streams. R modulators 1554a through 1554r may process the R output symbol streams (e.g., for OFDM) to obtain R output chip streams and may further condition the output chip streams to obtain R forward link signals, which may be transmitted via R antennas 1552a through 1552r. At terminal 120, the forward link signals from base station 110 may be received by antennas 1534a through 1534t, conditioned and processed by demodulators 1532a through 1532t, and further processed by an RX MIMO processor 1536 (if applicable) and an RX data and control processor 1538 to recover the traffic data and control information sent to terminal 120. The traffic data may be provided to a data sink 1539.

Controllers/processors 1540 and 1590 may direct the operation at terminal 120 and base station 110, respectively. Memories 1542 and 1592 may store data and program codes for terminal 120 and base station 110, respectively. A scheduler 1594 may schedule terminals for data transmission on the forward and/or reverse link and may assign resources to the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to determine quality of service (QoS) information for data to send, the QoS information comprising at least one of multiple possible QoS types, to determine an indication of a payload size, the indication being dependent on a spectral efficiency value, to map the indication to a backlog level value based on a format to use for a resource request, wherein a first format is used if the resource request comprises the QoS information and the backlog level value and a second format is used if the resource request comprises only the backlog level value, and to generate the resource request; and
a memory coupled to the at least one processor.

2. The apparatus of claim 1, wherein the multiple possible QoS types comprise QoS class and latency deadline.

3. The apparatus of claim 1, wherein the at least one processor is configured to determine the at least one QoS type to send in the resource request based on a configuration selected from among multiple configurations, each configuration being associated with one or more of the multiple possible QoS types.

4. The apparatus of claim 3, wherein the at least one processor is configured to determine one of a plurality of backlog level values based on the payload size, the plurality of backlog level values being applicable for all of the multiple configurations, and to generate the resource request further comprising the backlog level value.

5. The apparatus of claim 3, wherein the resource request comprises a fixed number of bits for all of the multiple configurations.

6. The apparatus of claim 1, wherein the at least one processor is configured to generate the resource request comprising the backlog level value and QoS class information if a first configuration is selected.

7. The apparatus of claim 6, wherein the at least one processor is configured to generate the resource request comprising the backlog level value and either the QoS class information or latency deadline information if a second configuration is selected.

8. The apparatus of claim 7, wherein the at least one processor is configured to generate the resource request comprising the backlog level value and the latency deadline information if a third configuration is selected.

9. The apparatus of claim 8, wherein the QoS information comprises latency deadline information, and wherein the resource request comprises one of four possible latency deadline values for the second configuration or one of eight possible latency deadline values for the third configuration.

10. The apparatus of claim 7, wherein the first configuration is selected for a first number of flows, and wherein the second configuration is selected for a second number of flows less than the first number of flows.

11. The apparatus of claim 7, wherein the QoS information comprises QoS class information, and wherein the resource request comprises one of eight possible QoS class values for the first configuration or one of four possible QoS class values for the second configuration.

12. The apparatus of claim 1, wherein the backlog level value corresponds to a number of bytes scaled by the spectral efficiency value.

13. A method for wireless communication, comprising:
determining quality of service (QoS) information for data to send, the QoS information comprising at least one of multiple possible QoS types;
determining an indication of a payload size, the indication being dependent on a spectral efficiency value;
mapping the indication to a backlog level value based on a format to use for a resource request, wherein a first format is used if the resource request comprises the QoS information and the backlog level value and a second format is used if the resource request comprises only the backlog level value; and
generating the resource request.

14. The method of claim 13, wherein the generating the resource request comprises:
generating the resource request comprising the backlog level value and QoS class information if a first configuration is selected,
generating the resource request comprising the backlog level value and either QoS class information or latency deadline information if a second configuration is selected, and
generating the resource request comprising the backlog level value and latency deadline information if a third configuration is selected.

15. An apparatus for wireless communication, comprising:
means for determining quality of service (QoS) information for data to send, the QoS information comprising at least one of multiple possible QoS types;
means for determining an indication of a payload size, the indication being dependent on a spectral efficiency value;
means for mapping the indication to a backlog level value based on a format to use for a resource request, wherein a first format is used if the resource request comprises the QoS information and the backlog level value and a second format is used if the resource request comprises only the backlog level value; and
means for generating the resource request.

16. The apparatus of claim 15, wherein the means for generating the resource request comprises:
means for generating the resource request comprising the backlog level value and QoS class information if a first configuration is selected,
means for generating the resource request comprising the backlog level value and either QoS class information or latency deadline information if a second configuration is selected, and
means for generating the resource request comprising the backlog level value and latency deadline information if a third configuration is selected.

17. A computer program product, comprising:
a non-transitory computer-readable medium comprising:
code for causing at least one computer to determine quality of service (QoS) information for data to send, the QoS information comprising at least one of multiple possible QoS types;
code for causing the at least one computer to determine an indication of a payload size, the indication being dependent on a spectral efficiency value;
code for causing the at least one computer to map the indication to a backlog level value based on a format to use for a resource request, wherein a first format is used if the resource request comprises the QoS information and the backlog level value and a second format is used if the resource request comprises only the backlog level value; and code for causing the at least one computer to generate the resource request.

18. An apparatus for wireless communication, comprising:
at least one processor configured to determine at least one type of information to send in a resource request, to determine a format to use for the resource request from among multiple formats based on the at least one type of information to send, and to generate the resource request comprising the at least one type of information in the determined format; and
a memory coupled to the at least one processor;
wherein the multiple formats comprise a first format for backlog level information and quality of service (QoS) information, and wherein the at least one processor is configured to use the first format if the at least one type of information comprises the backlog level information and the QoS information; and
wherein the multiple formats further comprise a second format for only the backlog level information, and wherein the at least one processor is configured to use the second format if the at least one type of information comprises only the backlog level information.

19. The apparatus of claim 18, wherein the at least one processor is configured to use the first format if the resource request is for a specific stream, and to use the second format if the resource request is for multiple streams.

20. The apparatus of claim 18, wherein the at least one processor is configured to use the first format for a stream associated with QoS information, and to use the second format for a stream associated with no QoS information or for multiple streams with varying QoS information.

21. The apparatus of claim 18, wherein the resource request comprises a fixed number of bits for all of the multiple formats.

22. The apparatus of claim 18, wherein the first format corresponds to a first range of values and the second format corresponds to a second range of values for the resource request.

23. The apparatus of claim 18, wherein the resource request comprises six bits, wherein the first format corresponds to a first range from 0 to 47, and wherein the second format corresponds to a second range from 48 to 63.

24. A method for wireless communication, comprising:
determining at least one type of information to send in a resource request;
determining a format to use for the resource request from among multiple formats based on the at least one type of information to send; and
generating the resource request comprising the at least one type of information in the determined format;
wherein the multiple formats comprise a first format for backlog level information and quality of service (QoS) information, and wherein the determining the format comprises using the first format if the at least one type of information comprises the backlog level information and the QoS information; and
wherein the multiple formats further comprise a second format for only the backlog level information, and wherein the determining the format comprises using the second format if the at least one type of information comprises only the backlog level information.

25. The method of claim 24, wherein the generating the resource request comprises determining a value for the resource request within a first range of values for the first format and within a second range of values for the second format.

26. An apparatus for wireless communication, comprising:
at least one processor configured to determine quality of service (QoS) class information or latency deadline information for data to send, to determine an indication of a payload size, the indication being dependent on a spectral efficiency value, to map the indication to a backlog level value based on a format to use for a resource request, wherein a first format is used if the resource request comprises the QoS information and the backlog level value and a second format is used if the resource request comprises only the backlog level value, and to generate the resource request comprising the backlog level value in a first field and the QoS class information or the latency deadline information in a second field; and
a memory coupled to the at least one processor.

27. The apparatus of claim 26, wherein the at least one processor is configured to map the QoS class information to a first range of values for the second field or to map the latency deadline information to a second range of values for the second field.

28. The apparatus of claim 26, wherein the second field comprises three bits, and wherein the at least one processor is configured to map the QoS class information to one of four possible values for the second field or to map the latency deadline information to one of four different possible values for the second field.

29. The apparatus of claim 26, wherein the at least one processor is configured to identify at least one stream to which the data to send belongs, to determine whether the at least one stream is associated with QoS class or latency deadline, to determine the QoS class information for the at least one stream if associated with QoS class, and to determine the latency deadline information for the at least one stream if associated with latency deadline.

30. A method for wireless communication, comprising:
determining quality of service (QoS) class information or latency deadline information for data to send;
determining an indication of a payload size, the indication being dependent on a spectral efficiency value;
mapping the indication to a backlog level value based on a format to use for a resource request, wherein a first format is used if the resource request comprises the QoS information and the backlog level value and a second format is used if the resource request comprises only the backlog level value; and
generating the resource request comprising the backlog level value in a first field and the QoS class information or the latency deadline information in a second field.

31. The method of claim 30, wherein the generating the resource request comprises mapping the QoS class information to a first range of values for the second field or mapping the latency deadline information to a second range of values for the second field.

32. The method of claim 30, wherein the second field comprises three bits, wherein the generating the resource request comprises mapping the QoS class information to one of four possible values for the second field or mapping the latency deadline information to one of four different possible values for the second field.

33. The method of claim 30 wherein the determining the QoS class information or the latency deadline information comprises
identifying at least one stream to which the data to send belongs,
determining whether the at least one stream is associated with QoS class or latency deadline, determining the QoS class information for the at least one stream if associated with QoS class, and determining the latency deadline information for the at least one stream if associated with latency deadline.

34. An apparatus for wireless communication, comprising:
at least one processor configured to determine an indication of a payload size, the indication being dependent on a spectral efficiency value, to map the indication to a backlog level value based on a format to use for a resource request, to select one of multiple backlog level values corresponding to different numbers of bytes scaled by the spectral efficiency and to generate the resource request comprising the selected backlog level value; and
a memory coupled to the at least one processor.

35. The apparatus of claim 34, wherein the at least one processor is configured to determine the spectral efficiency based on a most recent assignment of resources.

36. The apparatus of claim 34, wherein the at least one processor is configured to select one of multiple backlog level values corresponding to different numbers of bytes scaled by the spectral efficiency if the spectral efficiency is greater than a threshold value, and to select one of multiple backlog level values corresponding to different numbers of bytes if the spectral efficiency is equal to or less than the threshold value.

37. The apparatus of claim 34, wherein the at least one processor is configured to determine a number of tiles for each of multiple backlog level values based on the spectral efficiency, and to select one of the multiple backlog level values based on the payload size.

38. A method for wireless communication, comprising:
determining an indication of a payload size, the indication being dependent on a spectral efficiency value;
mapping the indication to a backlog level value based on a format to use for a resource request, wherein the mapping the indication to the backlog level value comprises selecting one of multiple backlog level values corresponding to different numbers of bytes scaled by the spectral efficiency; and
generating the resource request comprising the selected backlog level value.

39. The method of claim 38, wherein the mapping the indication to the backlog level value comprises selecting one of multiple backlog level values corresponding to different numbers of bytes scaled by the spectral efficiency if the spectral efficiency is greater than a threshold value, and selecting one of multiple backlog level values corresponding to different numbers of bytes if the spectral efficiency is equal to or less than the threshold value, and wherein the generating the resource request comprises generating the resource request comprising the selected backlog level value.

* * * * *